Gamma-ray fluorescence of 2,5-diphenyloxazole (10 gm/l) in solutions of p-dioxane plus water INVENTORS
HARTMUT P. KALLMANN
MILTON FURST
FELIX H. BROWN
BY
Stauch, Nolan & Neale ATTORNEYS

SCINTILLATOR SOLUTION ENHANCERS

Filed Oct. 14, 1959 7 Sheets-Sheet 2

. Gamma-ray induced fluorescence in hexane-xylene mixtures.

. Gamma-ray induced fluorescence in mixtures of *n*-Butyl-phosphate and xylene or phenylcyclohexane.

INVENTORS
HARTMUT P. KALLMANN
MILTON FURST
FELIX H. BROWN

BY

Strauch, Nolan & Neale ATTORNEYS

. Gamma-ray induced fluorescence in ethyl alcohol (95 percent)-xylene mixtures.

. Gamma-ray and light induced fluorescence in $CCl_4$-xylene mixtures, solute: fluoranthene.

INVENTORS
HARTMUT P. KALLMANN
MILTON FUERST
FELIX H. BROWN
BY
Stauch, Nolan & Neale ATTORNEYS

SCINTILLATOR SOLUTION ENHANCERS

Filed Oct. 14, 1959 7 Sheets-Sheet 4

. Gamma-ray induced fluorescence in paraffin oil-xylene mixtures.

. Florescence of 2,5-diphenyloxazole in mixtures with *n*-butylphosphate.

INVENTORS
HARTMUT P. KALLMANN
MILTON FUREST
FELIX H. BROWN
BY
Strauch, Nolan & Neale ATTORNEYS Effects of additional "solvents" on *n*-butylphosphate +9.10-diphenylanthracene (0.5 g/l).

. Gamma-ray-induced fluorescence of 2,5-diphenyloxazole solutions.

INVENTORS
HARTMUT P. KALLMANN
MILTON FURST
FELIX H. BROWN
BY
Strauch, Nolan & Neale ATTORNEYS

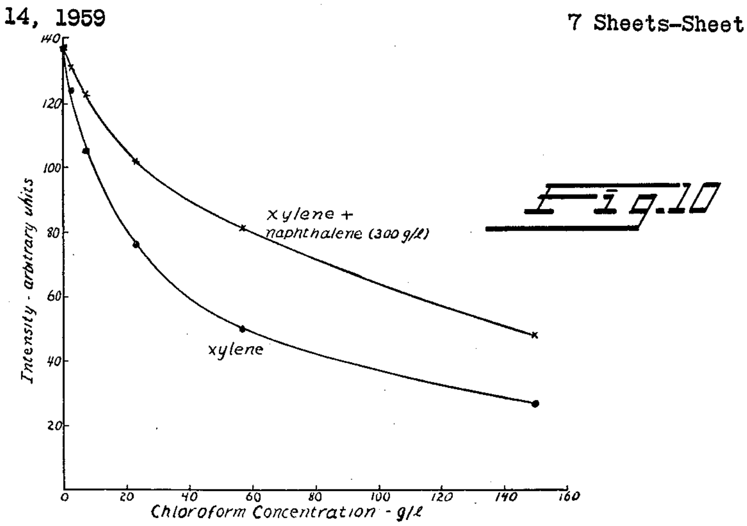

Fig. 10

. Effect of chloroform on solutions with 2,5-diphenyloxazole (5 g/l).

| Elements | Solution "Solvent"[a] | Solution Fluorescent solute | Percent of intensity of the same solute in xylene |
|---|---|---|---|
| Boron | Trimethylborate | 2,5-diphenyloxazole (3 g/l) | 5 |
| | Trimethylborate 50%+xylene 50% | 2,5-diphenyloxazole (3 g/l) | 79 |
| | Trimethylborate 47%+xylene 31% +naphthalene 22% | 2,5-diphenyloxazole (3 g/l) | 95 |
| Silicon | Tetraethylorthosilicate | α-naphthylphenyloxazole (3 g/l) | 5 |
| | Tetraethylorthosilicate 75% +naphthalene 25% | α-naphthylphenyloxazole (3 g/l) | 74 |
| Phosphorous | *n*-Butylphosphate | 2,5-diphenyloxazole (10 g/l) | 9 |
| | *n*-Butylphosphate 70%+naphthalene 30% | 2,5-diphenyloxazole (10 g/l) | 72 |
| Sulfur | Phenylcyclohexane 47%+thiophene 53% | 9,10-diphenylanthracene (20 g/l) | 28[b] |
| | Phenylcyclohexane 43%+thiophene 48% +naphthalene 9% | 9,10-diphenylanthracene (20 g/l) | 61[b] |
| Chlorine | Chloroform 15%+xylene 85% | 2,5-diphenyloxazole (4.5 g/l) | 20 |
| | Chloroform 14%+xylene 64% +naphthalene 22% | 2,5-diphenyloxazole (4.5 g/l) | 35 |
| Arsenic | Xylene 96%+triphenylarsine 4% | 9,10-diphenylanthracene (10 g/l) | 42 |
| | Xylene 86.5%+triphenylarsine 3.5% +naphthalene 10% | 9,10-diphenylanthracene (10 g/l) | 83 |
| | Xylene 81%+triphenylarsine 9.5% +naphthalene 9.5% | 9,10-diphenylanthracene (10 g/l) | 58 |
| Antimony | Xylene+triphenylstibine 1% | 9,10-diphenylanthracene (2 g/l) | 34 |
| | Xylene 87%+naphthalene 12% +triphenylstibine 1% | 9,10-diphenylanthracene (2 g/l) | 81 |
| | Xylene 81%+naphthalene 16% +triphenylstibine 3% | 9,10-diphenylanthracene (2 g/l) | 57 |
| Mercury | Xylene 90%+di-*n*-butylmercury 10% | α-naphthylphenyloxazole (5 g/l) | 9 |
| | Xylene 66%+naphthalene 23% +di-*n*-butylmercury 11% | α-naphthylphenyloxazole (5 g/l) | 15 |
| Lead | Tetraethyllead 10%+xylene 90% | 9,10-diphenylanthracene (10 g/l) | 24 |
| | Tetraethyllead 9%+xylene 81.5% +naphthalene 9.5% | 9,10-diphenylanthracene (10 g/l) | 39 |
| | Tetraethyllead 42.5%+xylene 42.5% +naphthalene 15% | 9,10-diphenylanthracene (10 g/l) | 15 |
| Bismuth | Xylene+triphenylbismuthene 2.5% | α-naphthylphenyloxazole (3 g/l) | 25 |
| | Xylene 73%+naphthalene 25% +triphenylbismuthene 2% | α-naphthylphenyloxazole (3 g/l) | 54 |
| | Xylene 70%+naphthalene 24% +triphenylbismuthene 6% | α-naphthylphenyloxazole (3 g/l) | 21 |

[a] The percentages indicated are of mass.
[b] In phenylcyclohexane rather than xylene.

Fig. 11

INVENTORS
HARTMUT P. KALLMANN
MILTON FURST
FELIX H. BROWN
BY
Strauch, Nolan + Neale ATTORNEYS Gamma-ray fluorescence of 2,5-diphenyloxazole (5 gm/l) in solutions of tri-n-amylborate plus naphthalene or xylene INVENTORS
HARTMUT P. KALLMANN
MILTON FURST
FELIX H. BROWN
BY
Stauch, Nolan & Neale ATTORNEYS 3,068,178

SCINTILLATOR SOLUTION ENHANCERS

Hartmut P. Kallmann and Milton Furst, Bronx, and Felix H. Brown, Kew Garden Hills, N.Y., assignors to Leonard E. Ravich, Brookline, Mass.

Filed Oct. 14, 1959, Ser. No. 849,701
15 Claims. (Cl. 252—301.2)

This invention relates to liquid scintillators wherein fluorescent emission is induced by high energy excitation and more particularly to techniques for increasing the fluorescence where the transfer of energy from the solvent to the solute is poor or inhibited by quenching materials present in the solution.

This application is a continuation-in-part of our application Serial No. 561,208 (now abandoned), filed January 25, 1956.

Scintillator solutions are composed primarily of a solvent and a solute which has the property of exhibiting fluorescence induced by high energy as far down and including the ultra-violet-light excitation. There are a large number of materials which exhibit fluorescence or light emission. These materials when dissolved in a suitable solvent usually provide a fast response to radiation, are of great value in studies involving very short resolving times, can be fabricated into a variety of shapes and have almost unlimited volume.

Since the solute is the material which exhibits the fluorescence, larger concentrations of solute will, in general, produce a greater amount of light emission for a given level of radiation incident on the scintillator liquid until self quenching effects become important. The maximum amount of solute that can be used in scintillator solutions is limited by its solvency in the solvent, and the usual scintillating solution contains only a few grams, usually less than 20, per liter of solvent. Optimum amounts are readily known or easily determined by those skilled in this art.

Many of the scintillator solutions have similar relative efficiencies for emitting light under both high energy and ultraviolet-light excitation and many other solutions exhibit a considerable variation between the different types of excitation as discussed in detail below. Thus some solvents, hereinafter referred to as "poor," are unfavorable for producing fluorescence from high energy excitation such as gamma ray radiation, or from alpha or beta particles.

The present invention relates to the addition of a substance, hereinafter referred to as an "intermediate solvent," to a conventional scintillator solution which has "poor" or "weak" light emitting properties to thereby increase the efficiency of the solution for the production of light. The present invention does not involve the discovery of new scintillator solutions, but simply a means for increasing the light emission efficiency of those solutions which are weak light emitters.

Fluorescence from known good scintillator solutions induced by high-energy radiation is often strongly reduced by the presence of certain substances which are placed in the scintillator solution. This condition has been found to exist, for example, in solutions of xylene as a solvent and terphenyl as the light emitting solute when oxygen is added to the solution and also in a solution where tetralin is used as the solvent and 9,10-diphenylanthracene is used as the solute when the tetralin is exposed to air. Another example is presented by the introduction of nitric acid molecules into the scintillator solution which produces strong quenching of the high-energy fluorescence of xylene or phenylcyclohexane solutions.

Placement of radio-active shubstances in liquid scintillators, for example, offers in many cases higher fluorescence efficiencies that can be obtained with the substance external to the scintillator. However, such a technique is often limited because of the decrease of light output of the scintillator solution by the desired substance whose radio-activity is to be measured, as in the case where the substance to be tested contains elements of medium or heavy atomic weights, i.e., having an atomic number of 10 or greater. The fluorescence efficiencies of conventional scintillator solutions are also reduced by the introduction of additional material to make the desired substance soluble in the scintillating solution.

Heretofore, the scintillation solution frequently used employed a material such as 2,5-diphenyloxazole as the solute with toluene, dioxane, or xylene as the major solvents. Certain organic compounds caused a quenching effect in the system and water soluble materials could not be tested. If a water soluble material were to be examined it was necessary to add ethanol to the solution so that a small amount of water could be tolerated. This procedure was quite unsatisfactory and a substantial decrease in efficiency was noted due to quenching effect of the water which, for all practical purposes, could be considered a contaminant.

Prior efforts to provide scintillating solutions containing water are reported in articles by F. N. Hayes and R. Gordon Gould, published in Science, volume 117, pp. 480–481, May 1, 1953, and Earle C. Farmer and Irving A. Berstein, published in Science, volume 115, pp. 460-461, April 25, 1952. In the former article it is stated that the principal advantage of using dioxane as the solvent was that it was then not necessary to add ethanol to produce miscibility of the water sample. The article continued, however, to state that the efficiency of dioxane as a scintillation solvent is sufficiently inferior to toluene and xylene that the latter solvents provide a greater sensitivity, although dioxane permits counting of larger samples. The latter article similarly describes a liquid scintillator suitable for both organic and water soluble materials and an experimental arrangement that permits high counting efficiency. The solution employed was p-dioxane saturated with p-terphenyl, the fluorescence output of which is very poor relative to the non-water containing scintillating solutions. In accordance with our present invention the water content can be increased by a factor of at least ten with sufficiently high efficiency for effective use.

It is accordingly the primary object of this invention to provide a technique for enhancing the fluorescence induced by high-energy radiation either directly in or outside of the solutions where fluorescence is relatively low due to either use of a "poor" solvent or due to quenching materials present in the solution.

In accordance with this invention, it has been found that substances exist which, when put into poorly fluorescent solutions in sizable amounts, enhance the fluorescence to a greater extent than does the introduction of the known most efficient solvents. The enhancing substances are not solvents normally used in scintillating solutions which have maximum fluorescence and may be substances which are solid at room temperature. These substances which enhance the fluorescence of the scintillator will be referred to as "intermediate solvents."

It is another object of the invention to provide as an "intermediate solvent" a material which undergoes smaller quenching by surrounding molecules than do the excited molecules of other substances normally used in the liquid scintillator solution.

A major effect of many useful substances appears to be a quenching of the energy present in the excited solvent molecule. As explained in detail below, it appears that energy transfer takes place to the solute from the solvent molecules with the probability of energy transfer being smaller for the "poor" solvent than for an "efficient" solvent. The probability of energy transfer is proportional to the concentration of the molecules to which the energy is transferred, the life time of the excitation of the solvent molecule, and the "collision" cross section associated with the transfer of energy from the excited solvent molecule to the solute molecule. Based on the experiments described below, it is believed that the probability of energy transfer is effected quite largely by the life time of excitation of the solvent molecule which factor is in turn determined mostly by the probabilities of internal and external quenching processes.

"Intermediate solvent" is a substance (it may be solid at room temperature) which when present in moderate amounts (greater than 20 g./l.) has property of taking over much or most of the energy originally in the bulk material (major solvent) and transferring it more efficiently to the emitting solute (fluorescing material) than does the bulk material. The lowest excited electronic state of the "intermediate solvent" lies between that of the bulk material and that of the emitter. (The lowest state has an energy greater than 3.4 e.v.) The transfer to and from the "intermediate solvent" does not take place primarily via radiation. The time constant of the "intermediate solvent" is longer than that of the bulk material.

The effectiveness of the substance as an "intermediate solvent" is believed to be due to two processes. First, a more efficient energy transfer occurs from the "poor" solvent to the "intermediate solvent" than, for example, to a known "efficient" solvent such as xylene. Secondly, the excited "intermediate solvent" molecules undergo a smaller quenching by surrounding molecules than do the excited molecules of other substances. The quenching of the excited solvent molecule by the addition of special molecules, such as those containing oxygen or elements of medium or heavy atomic weights, is often more prominent than that of the solute molecule.

A further primary object of the invention is to provide for a weakly fluorescing scintillator solution an additive such as naphthalene and other compounds which can be similarly employed to enhance the fluorescence of such scintillator solutions. While the additives have been named by us as "intermediate solvents," they are not an "efficient" solvent capable of being used as the bulk solvent. Instead, the usual bulk solvent is used, a few grams per liter (usually less than 20) of the conventional solute is added to make up the conventional scintillator solution. If this solution is a relatively weakly fluorescing solution, then addition of the "intermediate solvent" in accordance with the present invention produces increased light emission to thereby enhance the efficiency of the scintillator solution.

The "intermediate solvent" in accordance with the present invention utilizes entirely different phenomena than are present in the use of mixtures of two light emitting solutes in the solvent for shifting the wave length or spectrum of the emitted light as was accomplished by us earlier and/or as is disclosed in U.S. Patent No. 2,755,253 to Muelhause et al. To shift the wave length or spectrum of the emitted light, only small quantities, e.g. a few milligrams per liter, of the second light emitting solute such as diphenylhexatriene, are used whereas in the present invention, several grams, e.g. at least 10 and usually more than 20 grams per liter, of the "intermediate solvent" are added to the bulk solvent and light emitting solute. Thus, the "intermediate solvent" additive of the present invention is usually present in the scintillator solution in a quantity greater than the quantity of the light emitting solute.

It has been further found that the "intermediate solvents" which are effective as enhancing substances have a lowest energy level of excitation that is smaller than the lowest energy level of excitation of the primary solvent and greater than the energy level of excitation of the solute. Thus, it is possible to find an "intermediate solvent" effective to enhance the fluorescence output of nearly every weakly fluorescing scintillator solution where fluorescence is relatively low due to either use of a "poor" solvent or due to quenching material present in the solution. In view of the large number of known scintillator solutions, the same "intermediate solvent" is not effective for every solution. While naphthalene is an effective "intermediate solvent" for many scintillator solutions, it has been found that solutions employing p-terphenyl as a light emitting solute cannot be enhanced with naphthalene apparently because of lack of energy transfer. This is explainable because the energy level of excitation of naphthalene is very close to the energy level of excitation of p-terphenyl. However, an "intermediate solvent" such as biphenyl which has a lower energy level of excitation than naphthalene can be used to enhance solutions containing p-terphenyl.

In addition to many physical and chemical applications it is important in biological (medical, biochemical) research for example, to measure the activity of physiological compounds labelled with radioactivity. Since the activity is generally small, the best method is to dissolve the compound in the scintillator solution of a liquid scintillator counter. This has been successfully used in many cases, for example with labelled steroids. Many important compounds, however, are not soluble in the usual scintillator solutions because of solvent polarity.

Another object of the invention is to provide an improved scintillation solution containing water, 5% or more, whereby certain water soluble substances such for example as metallic salts, water soluble organic solids important for biological use and the like may be dissolved in the solution. Water has been found to reduce the fluorescence efficiency to a degree making the scintillation solution essentially useless for detection and measurement. The greater the water content, the less the light output. However, for a large number of biological, medical and physical applications, large amounts of water are essential for solubility. These solutions may be made far more efficient by the use of the present invention.

Solutions containing alcohols such as ethanol and methanol are "poor" primary solvents of special importance in work with biological materials. The addition of naphthalene to such solutions produces a moderate increase in fluorescence. Accordingly, another object of the invention is to provide an improved method of preparing a scintillating solution containing alcohols and an "intermediate solvent" such as naphthalene.

A further object of the invention is to provide efficient scintillator solutions embodying certain compounds insoluble in water or in dioxane, but soluble in a mixed solvent, for example, in a mixture of suitable proportions of dioxane and water to provide the necessary polarity of the solvent.

When one or more substances have been placed in the liquid scintillator, for example compounds containing heavy metals or boron for neutron detection, we have found that the fluorescence efficiency of the liquid scintillating solution can be increased by the use of an appropriate "intermediate solvent" such for example as naphthalene, biphenyl, phenol and the like, with a known "efficient" solvent such as xylene.

It is accordingly a further object of the invention to provide a novel liquid scintillating solution wherein the solvent contains desired elements for example of intermediate or heavy atomic weight and naphthalene or a similar compound. Scintillator solutions containing compounds of elements of atomic number greater than 10 are poor light emitters since in most cases such elements quench the fluorescence of a scintillator. Experiments and applications especially in nuclear physics, often use materials containing elements of large atomic numbers. The invention makes detection and measurement feasible under the adverse conditions which prevail when high atomic number materials are in the scintillator.

Solutions containing boron are especially useful for neutron detection. The most effective boron containing solution known to us prior to our invention employed mixtures of phenylcyclohexane and trimethylborate as a solvent as reported in an article by Muehlhause and Thomas published in Physical Review, vol. 85, p. 926 (1952). In accordance with our invention, solutions in alkyl borate esters have been found to have greatly increased fluorescence upon adding considerable amounts of an "intermediate solvent" such as naphthalene. This solution is additionally desirable because it is less subject to hydrolysis when exposed to the atmosphere. It is accordingly a further object of the invention to provide an enhanced liquid scintillation solution containing boron.

While a slight impurity content in the solvent substances does not affect the fluorescence of the scintillating solution in many cases, it has been found that slight impurities in certain solvents have a marked effect on the light emission of the solution as the concentration of the impurity containing solvent is increased. It is a further object of this invention to provide for such solvents a novel method of detecting the presence of certain impurities.

It is a further important object of this invention to provide for the enhancement of liquid scintillators of high viscosity, an important group of such scintillators being rigid plastic scintillators. Plastic scintillators are essentially of two types in relation to the invention. One type, such as scintillators made with polystyrene or polyvinyl toluene, are made by the "intermediate solvent" of the present invention to fluoresce efficiently at much lower concentration of the emitting materials than without the invention. This is of great significance when emission through long lengths of scintillators are required as in use with a grid of rods. Absorption by large concentrations of emitting materials is eliminated. This application is important in present day nuclear work.

| Example: | Intensity, arbitrary units |
|---|---|
| [Polystyrene]+2,5-diphenyloxazole (0.023 M) | 1 |
| [Polystyrene+naphthalene, 0.2 M]+2,5-diphenyloxazole (0.0045 M) | 1 |

The other type, such as scintillators made with polymethylmethacrylate (PMMA), is made by the invention to fluoresce much more efficiently at all practical concentrations.

| Example: | Intensity, arbitrary units |
|---|---|
| [PMMA]+2,5-diphenyloxazole (0.045 M) | 1 |
| [PMMA+naphthalene 0.8 M]+2,5-diphenyloxazole (0.045 M) | 2.4 |

Another important object of this invention resides in providing an improved radiation detecting and measuring device for sources which may or may not be dissolved in the solution. Such a device consists of a light detecting and measuring unit such as a multiplier phototube with associated electronic equipment, and the scintillating solution, containing the "intermediate solvent" which enhances the energy transfer from the bulk material to the emitter.

These and other objects of the invention will become more fully apparent from the claims, and as the description proceeds in connection with the drawings wherein:

FIGURES 7 through 10 are graphs showing the results of a second series of further tests;

FIGURE 11 is a table of fluorescent solutions containing various substances;

Figure 1:
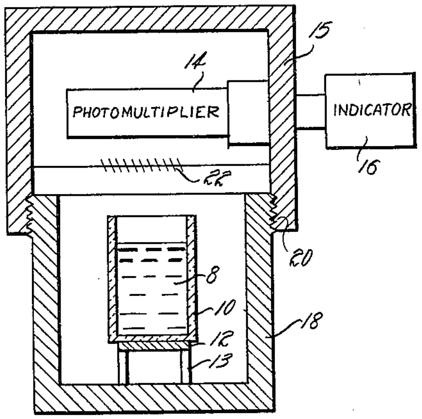
FIGURE 1 is a diagrammatic illustration of the apparatus used in carrying out the tests which form the basis of the present invention.

Basic investigations of various solvent combinations were made usually keeping the solute concentration (grams/liter of solution) unchanged and with apparatus of the general type as illustrated in FIGURE 1. The scintillation solution 8 was either placed in a beaker 10 of material "non-reflecting" to the radiation to be detected and excited by a one millicurie gamma-ray source 12 located on support 13, or was placed in beaker 10 of porcelain or glass and excited by a light from a similarly placed source 12, the light energy being directly incident upon the solution and having a wavelength which is absorbed only by the solute. The fluorescence output was measured by means of an arrangement using photomultiplier 14 of a 1P28 type supported in cap 15 and the integrated fluorescence output was provided by indicator 16. The background light level was kept low so that the only light energy received by photomultiplier 14 was from the liquid scintillating solution 8. For this purpose, container 18 as shown in FIGURE 1 was used, though a darkened room may be used. Cap 15 and container 18 were threaded at mating ends 20 and shutter 22 was provided for controlling the light intensity on the photomultiplier tube.

Pairs of solvents were used such that one solvent could usually be described as the "effective" solvent, and the other as the "poor" solvent. In an "effective" solvent rather strong fluorescence is produced under gamma-ray excitation when suitable solutes are dissolved in it, whereas in a "poor" solvent the same solutes produce only a small light output. Typical results are depicted in FIGURES 2 to 5; in these graphs the fluorescence with 100 percent "effective" solvent is always shown on the left.

There are essentially two different types of curves in these figures. Type I shown in FIGURES 2 and 3 does not show a marked decrease in fluorescent output until large amounts of the "poor" solvent are added; only as 100 percent "poor" solvent is approached does the fluorescent output dip sharply.

Figure 4:
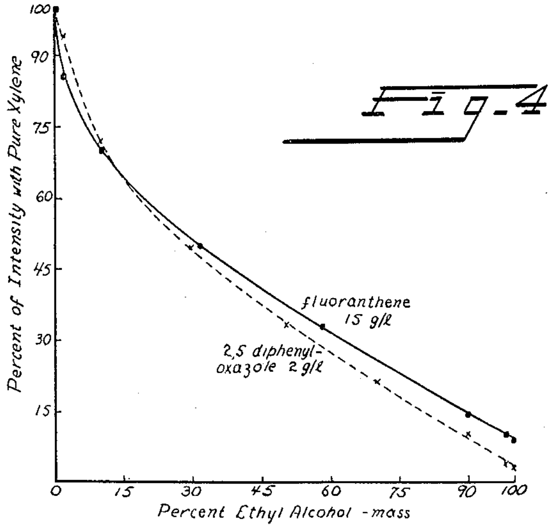
Figure 5:
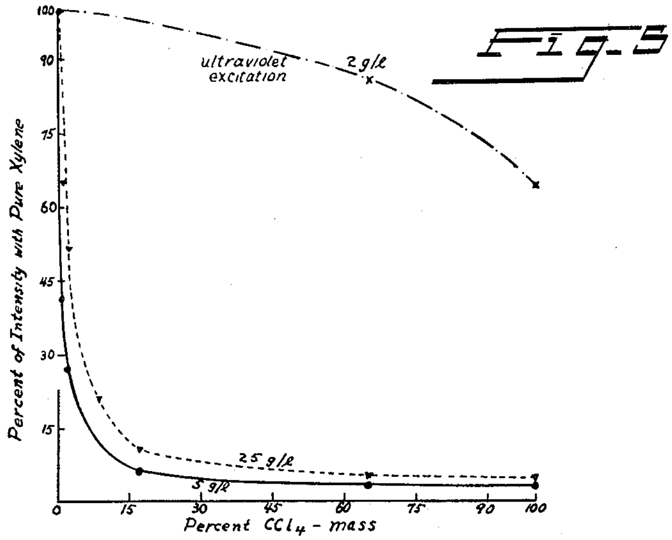

Curves of type II, shown in FIGURES 4 and 5 on the other hand, show a sharp initial drop when only small amounts of the "poor" solvent have been added. This behavior is clearly shown, for example, when carbon tetrachloride is added to xylene solutions of fluoranthene (FIGURE 5). Curves lying between these extremes are found in some of the experiments.

The curves of FIGURES 2 to 5 depict results for gamma-ray excitation unless otherwise indicated; under ultraviolet light excitation the shapes of the curves are often very different, as can be seen for example from FIGURE 5. With many solvent combinations under ultraviolet excitation some solutes (e.g., fluoranthene), have almost the same fluorescent yield with 100 percent "poor" solvent as is found with 100 percent "effective" solvent. These differences for the two types of excitation stem from the necessity for energy transfer from solvent to solute under gamma-ray excitation to produce strong fluorescence. Under ultraviolet light excitation the light-emitting solute molecule is directly excited, so that if a change because of variation of the solvent is found, it is to be attributed to a quenching of the excitatation of the solute before the light-emission process occurs. A comparison between the results for light and gamma-rays then makes it possible to differentiate between the effects due to solute quenching and those depending upon energy transfer. The results obtained with light excitation show that the light-emission efficiency generally is not impaired by the presence of the "poor" solvent. It can thus be definitely stated that in these experiments no new impurities which markedly affect the light output of the solute are introduced into a solution when the "poor" solvent is added.

In Table I solvents of high purity at the time of the tests are arranged according to their relative capabilities of energy transfer. This table may be interpreted by assuming that the solvents marked "efficient" in the table have the longest actual lifetimes of excitation and those marked "poor" the shortest. Most of the better solvents contain double bonds. p-Dioxane is the only very good solvent known which contains no double bonds, although there are many such with moderate transfer ability (e.g., cyclohexane and Decalin). There are, of course, numerous solvents which do contain double bonds and have inferior transfer properties.

TABLE I

*Qualitative Solvent Ratings for Gamma-Ray Induced Fluorescence*

| "Efficient" | "Moderate" | "Poor" |
|---|---|---|
| Benzene. | 1-Ethoxynaphthalene. | Acetone. |
| Cumene. | Benzyl alcohol. | Carbontetrachloride. |
| Iso-durene. | Benzyl ether. | Chloroform. |
| p-Cymene. | Cyclohexane. | Ether. |
| p-Dioxane. | Decalin. | Ethyl alcohol (95 percent). |
| Phenetole. | Hexane. | Methyl alcohol. |
| Phenyl ether. | Paraffin Oil. | n-Butylphosphate. |
| Phenylcyclohexane. | Styrene. | |
| Tetralin. | Tetrahydrofuran. | |
| Toluene. | | |
| Xylene. | | |

We now present our theory for explanation of the improved results secured:

Consider first the behavior under gamma rays of a solution made with a "poor" solvent, that is, one in which a low fluorescent output is obtained for all solutes, even for those which are efficient under ultraviolet excitation. The low output which occurs under high-energy irradiation in such solutions is then to be attributed to poor transfer of energy from the solvent to the solute. The assumption might be made that no transfer at all takes place from the "poor" solvent to the solute. This is, however, certainly not the case in many solutions made up with a single "poor" solvent rather than a combination of solvents; in these the light emission is found to increase considerably with increasing solute concentration (at concentrations sufficiently small to make direct excitation effects negligible). In addition, under the assumption of no transfer, the extended flat portions of some of the curves which are obtained using various solvent combinations cannot be explained. It is consequently assumed that energy transfer can take place to the solute from both types of solvent molecules of a combination, the probability of energy transfer being smaller for the "poor" solvent.

The probability of energy transfer, $w$, is approximately proportional to the concentration $c$, of the molecules to which the energy is transferred, to the lifetime, $t$, of the excited solvent molecule (this is determined mostly by the probabilities of internal and external quenching processes); and to a "collision" of cross section, $\sigma$, associated with the transfer of energy frm the excited solvent molecule to the solute molecule. Thus approximately $$w \sim \sigma t c \quad (1)$$

The probability for energy transfer enters the expression for light emission under high-energy excitation in the following way: The equation $$I = \frac{Pc}{(Q+c)(R+c)} \quad (2)$$

gives the intensity of fluorescent light output, I, as a function of solute concentration, $c$, and parameters P, Q, and R. The parameters P and R are defined in our article published in Physical Review, vol. 85, p. 816 (1952), which article is incorporated by reference in this application to more fully explain background material leading up to the present invention. The parameter Q is proportional to the reciprocal of the energy transfer probability per unit concentration [i.e., to $(\sigma t)^{-1}$]. It has been found that this parameter varies only slightly for a given efficient solvent (same $t$) with many different efficient solutes, and furthermore, the concentration for efficient energy transfer is found to be of the same order of magnitude for most of these solutes. These findings imply that the cross section does not vary greatly for most efficient solutes. From the experimentally known decay times of the solute light flashes, one can also infer that the actual lifetime of the excited solvent molecules must be of the order of $10^{-9}$ second or smaller.

With reference to the above questions, the "poor" solvent is thought to be one in which the actual lifetime, $t$, of the excited solvent molecule is smaller than is the case for an "effective" solvent, which means a large Q in Eq. 2 for the "poor" solvent. One could also assume that $\sigma$ the transfer cross section, is strongly reduced in a "poor" solvent, but then one would also have to assume that such a cross-section reduction occurs for all solutes. The expectation would then be a considerable variation in Q among the different solutes, but less variation than expected under such an assumption is found. Furthermore, it will be shown below the the shape of the curve can be understood more easily if the assumption is made that it is the lifetime of the excited molecule that is reduced. With a reduced $t$ at a given concentration of solute molecules, the number of "collisions" which are accompanied by energy transfer are insufficient to produce sizable transfer during the comparatively short actual lifetime of these excited solvent molecules. This idea is borne out by the fact that in "poor" solvents a considerable increase in fluorescence is obtained under gamma-ray excitation if greater concentrations of the solute are present than are needed in an "effective" solvent (see FIGURE 5). These concentrations are in a range where an increase of light output is no longer obtained in an "effective" solvent but are still small enough for direct-excitation effects of the solute to be negligible. It is of interest to note that in solutions made with "poor" solvents the influence of self-quenching on the shape of the fluorescence vs. concentration curve seems to be less evident since the usual decrease after reaching a maximum is almost completely eliminated. This comes about because of the poorer energy transfer which shows up in Eq. 2 as a relatively large value for the coefficient Q. Nevertheless the effect of self-quenching is still present and is even more important because of the higher solute concentrations necessary for obtaining maximum light outputs. The concentration $c_m = (QR)^{1/2}$, at which the maximum light output occurs according to Eq. 2, is shifted to higher concentrations in "poor" solvents because of their higher Q, and the maximum intensity $I_m = P/(Q^{1/2} + R^{1/2})^2$ is reduced for the same reason.

If the fluorescence of a solute under ultraviolet light excitation so that its internal quenching can be determined and if its self-quenching coefficient [associated with factors P and R in Formula 2] is available, the fluorescence obtained under gamma-ray excitation can be adjusted for equal internal quenching and zero self-quenching of the solute, and then the effects due to energy transfer can be evaluated.

When small amounts of an "effective" solvent are added to a solution in a "poor" solvent or vice versa, one might except a mixture curve to be followed since the high-energy radiation is absorbed in these organic solvents essentially in the ratio of the masses of the two solvents. Such a curve would be a straight line if the ultraviolet light induced fluorescence in the "poor" and "effective" solvents were of equal magnitude. With equal light fluorescence any chemical interaction influencing fluorescence would be ruled out or be equal. In most instances a straight line does not result as can be seen from the curves of FIGURES 2 to 5.

The addition of relatively small amounts of "effective" solvent to a solution made in a "poor" solvent often produces a rapid increase in the gamma-ray induced fluorescence. This means that with small amounts of an effective solvent a considerable amount of energy absorbed in the "poor" solvent reaches the solute. In order to account for this we assume that energy transfer occurs from excited molecules of the "poor" solvent to (unexcited) "effective" solvent molecules and then to the solute.

This assumption is made because: (*a*) It is known that in these solutions with a given fraction of "effective" solvent present no more than about this fraction of incident energy is directly absorbed in the "effective" solvent, and (*b*) a large portion of the available energy in the "effective" solvent goes to the solute at the concentrations used, whereas practically no energy transfer occurs from the "poor" solvent to the solute as shown by the experiments with only a single solvent present. Such transfer is possible if the lowest excitation energy of the "effective" solvent molecule is smaller than that of the "poor" solvent, and it takes place if a sufficient number of "effective" solvent molecules are present in the solution. (Ionization effects are not completely ruled out in these experiments with "poor" solvents.) Under such circumstances a considerable transfer may occur with only about 10 percent of "effective" solvent, despite the relatively short lifetime, $t$, of the excited "poor" solvent molecule. In effective solvents energy transfer from the solvent occurs at solute concentrations of several grams per liter. Here the energy transfer from the "poor" solvent to the "effective" one occurs at concentrations of about 100 grams per liter. This indicates that the actual lifetime of the excited "poor" solvent is less than one tenth of that of the "effective" solvent. This is in agreement with the behavior that at a given solute concentration, the fluorescent yield under high-energy excitation is reduced by more than a factor of ten in a "poor" solvent. Once the energy resides in the "effective" solvent molecule, its actual lifetime is increased (now $t$ is the lifetime of the excited molecule of good solvent). Now the energy can easily be transferred again, this time from the "effective" solvent to the solute, with a corresponding increase in fluorescence.

It should be here noted that in the process of energy transfer in solution only the lowest excited states need be considered since these states have the longest lifetimes. The higher excitation levels have comparatively short lifetimes on account of the many possibilities of degradation of energy to the lowest levels because of strong interaction with phonons. The lowest excited states of the "poor" solvent will consequently be reached very quickly, and effects connected with the higher states are unimportant. The energy will then be transferred to the lowest excited state of the "effective" solvent if this state has a smaller excitation energy than that of the "poor" solvent and if the "effective" solvent concentration is great enough. In such a case no return of the energy to the "poor" solvent is possible. It may be remarked that energy transfer has never been observed where the lowest excitation energy of the solvent is below that of the solute. The emission of the solute is always that of the lowest level.

Thus an energy transfer from the "poor" to the "effective" solvent is assumed, similar to that which has been successful in explaining the high-energy induced fluorescence in dilute solutions in a single "effective" solvent.

If energy transfer from the "poor" solvent to the "effective" solvent and then to the solute were the only pertinent mechanism, the fluorescent intensity would increase more quickly than a mixture curve in practically all cases in which an "effective" solvent is added to a solution made in a "poor" one and the necessary energy condition is fulfilled. In numerous cases, however, this does not occur (e.g., curves of FIGURE 4), indicating that other effects must be taken into account. This is particularly true for those curves which display a sharp drop in intensity when small amounts of "poor" solvent are added.

The behavior of solutions under light excitation helps clear up the situation. It is found that when substances like xylene, durene and p-terphenyl are used as solutes, their light-induced fluorescence (the solute molecules are directly excited) is tremendously decreased (quenched) upon the addition of even small amounts of "poor" solvents like carbon tetrachloride which exhibit a type II behavior. This quenching means that the actual lifetime of the excited state of these solutes is shortened by the addition of such a "poor" solvent. Solvents displaying a type I curve quench only to a slight extent if at all. These results provide experimental evidence that some "poor" solvents quench materials some of which are used as "effective" solvents, e.g., xylene. This supports the contention made above that the change in lifetime $t$ rather than that of cross section $\sigma$ is of greater significance for the change of energy transfer.

Therefore, one must expect that a similar shortening of lifetime of excited molecules of the "effective" solvent is produced by the presence of even small amounts of a suitable "poor" solvent. Most of the curves can then be explained as follows: In a solution made with a combination of an "effective" and a "poor" solvent, all or practically all of the excitation energy initially induced in the "poor" solvent is transferred to the "effective" one (if the excited energy level of the "poor" solvent is above that of the "effective" solvent), so that most of the excitation energy eventually resides in the "effective" solvent. At the same time, however, the actual lifetime of the excited molecules of "effective" solvent (independently of whether their excitation is induced directly or by energy transfer from the "poor" solvent) can be decreased by the presence of the "poor" solvent (markedly with type II solvents) and in such cases the energy transfer to the solute is diminished. Consequently the fluorescent-light output declines with increasing concentration of such "poor" solvents. If this quenching effect of "poor" solvents on excited molecules of "effective" solvents is very strong, a sharp decrease of fluorescence is observed with small amounts of added "poor" solvents. These considerations provide an explanation for the type II, sharply decreasing fluorescent-light output curves.

This idea of quenching of the excited sovent molecule is given further credence by the effects of increasing solute concentration upon these curves. It is found that at greater solute concentrations, the degree of the decrease in light output resulting from the addition of "poor" solvent is diminished. This shows that the excitation energy must not necessarily be lost; at larger solute concentrations the number of "collisions," with accompanying energy transfer, per unit time is increased so that more energy goes to the solute before the excited solvent molecule is quenched. In other cases the influence of the "poor" solvent on the "effective" solvent may be slight, and curves which lie above the mixture curve are obtained.

A pertinent example bearing out the above ideas is that in FIGURE 5, where the fluorescence of fluoranthene in carbon tetrachloride-xylene combinations is shown. Under ultraviolet light excitation the fluorescence of fluoranthene is only moderately decreased as one proceeds from pure xylene to pure carbon tetrachloride as solvent. Under gamma-ray excitation, however, the addition of only 5 percent carbon tetrachloride causes a reduction in fluorescence by more than a factor of 2. It is also readily observed in this figure that at large concentrations of fluoranthene less decrease in light emission occurs. The strong decrease in fluorescence under gamma-ray excitation this reduction in fluorescence is less in spite of the of the excited xylene molecules produced by carbon tetrachloride molecules. At greater fluoranthene concentration this reduction in fluorescence is less in spite of the decreased lifetime of excitation of xylene molecules because a greater number of "collisions" with the solute molecules occur within this lifetime period.

Study of one solvent combination with different solutes shows that the shape of the light-output curve (whether type I or II) is generally unchanged; but this is not strictly true in all cases. For example, pyrene and m-terphenyl show anomalies in xylene-hexane and xylene-trimethylborate mixtures. These may be associated with the poorer energy transfer to these solutes when observed in xylene (this is deduced from the larger Q values obtained for these solutes). Actually, hexane and trimethylborate produce only slight decreases in the actual lifetime of the excited solvent molecule (xylene) as is shown by the many type I curves obtained with these solvents. Because of the generally poor energy transfer to pyrene and m-terphenyl, however, the effect of this small decrease in $t$ is more easily noticeable in the range of concentrations here employed. Thus, in Eq. 2, if $c$ is large compared to Q, relatively large changes in Q are necessary to produce sizeable changes in the light output; but if Q and $c$ are of the same order, then a much smaller relative change in Q produces the same change in emission. In the solutions of pyrene and m-terphenyl the concentrations, $c$, at which considerable light emission occurs and the Q were of the same order of magnitude so that the effect of the comparatively small changes in Q produced by hexane and trimethyl borate were more easily observed.

Figure 6:
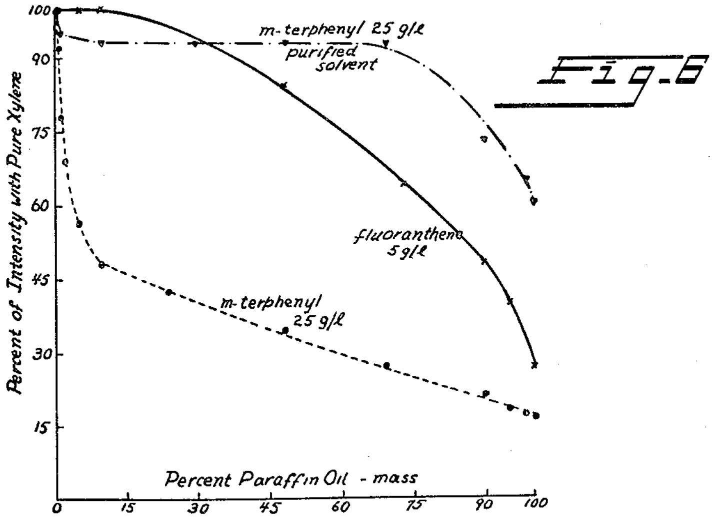

A particularly unusual behavior was found in some experiments with xylene-paraffin oil combinations. With fluoranthene a type I curve was obtained, whereas a type II curve was exhibited with m-terphenyl (FIGURE 6). Such a difference indicated the presence of impurities in the solvent since in no other cases were two different types of behavior found in the same solvent combination. Measurements with light excitation did indeed reveal the presence of an impurity affecting m-terphenyl but scarcely influencing fluoranthene (because of their different absorption spectra). As can be seen from FIGURE 6, when a purer paraffin oil is used the result with m-terphenyl is also of type I if the effect of the high Q of m-terphenyl is taken into account. This experiment shows that such mixed solvent measurements can reveal the presence of impurities.

In most of the experiments herein reported the role of impurities as causes of the large effects discussed in the earlier sections can be ruled out by theoretical considerations and previous studies of the importance of impurities. Nevertheless many of the materials (both solvents and solutes) were additionally purified as by continuous chromatography. These further purifications (including the removal of oxygen) produced only minor changes and did not alter the type I or type II behaviors. This shows that a "poor" solvent under high-energy induced fluorescence is not inferior because of the presence of impurities, but rather because of properties intrinsic to the solvent.

The experiment described above with mixed solvents using high-energy shows that two processes are mainly responsible for the observed effects: (1) the decrease in the lifetime of the excited molecule of "effective" solvent in the presence of a suitable "poor" one, and (2) the occurrence of energy transfer from "poor" to "effective" solvent. The process responsible for quenching of the "effective" solvent by the "poor" is as yet unknown. The following observation, however, provides a clue. It is quite often found that molecules having greater excitation energies are more easily quenched by other molecules than those with smaller excitation energies.

If the "poor" solvent has a lowest (singlet) excitation level of smaller energy than the lowest level of the "effective" solvent, a decrease in light output by the addition of "poor" solvent could be attributed to an energy transfer from the "effective" to the "poor" solvent. In the cases of the addition of carbon tetrachloride or alcohol where the lowest excitation energies are above those of xylene, this certainly is not the reason for the decreased emission. In acetone, however, which has a lower excitation energy than xylene, the type II behavior found is very likely at least partially because of such an energy transfer. When energy transfer occurs from a molecule with shorter lifetime to one with a longer lifetime, the experiments described show that the fluorescent output is enhanced. It has been found that such a process can successfully be employed to make rather efficient solutions containing considerable amounts of substances which ordinarily exhibit inferior high-energy induced fluorescence properties.

It is thus shown that the high-energy-induced fluorescence in scintillation solutions which have reduced light emission due to either a "poor" solvent or contaminating substances which cause quenching of the solvent molecules is caused by lack of energy transfer from the solvent to the fluorescent solute molecule. There is presented strong evidence to indicate that the lack of energy transfer is a consequence of the very short lifetime of the excited solvent molecule.

It is also shown that another effect frequently impeding the high-energy-induced fluorescence is that some molecules, especially those of a "poor" solvent, often have the property of quenching other excited molecules, primarily of the solvent and to some extent possibly of the solute, thereby reducing the high-energy-(and light)-induced fluorescence.

The next group of tests to be described was performed with the same general arrangement of equipment as shown in FIGURE 1. The purpose of these tests was to establish that "intermediate solvents" were available which would increase the high-energy-induced fluorescence in solutions where there is a lack of energy transfer from the solvent to the fluorescent molecule.

The particular effect of naphthalene is demonstrated in FIGURES 7 to 11. N-butylphosphate which is a "poor" solvent was used as the basic solvent; it is very stable and little deterioration of the fluorescene of suitable solutes with time is found. Considerable quantities of many organic substances of interest for high-energy fluorescence can be dissolved in it. This solvent by itself, however, displays only small high-energy fluorescence with most of the well-known fluorescent solutes in the usual moderate concentrations.

Figure 7:
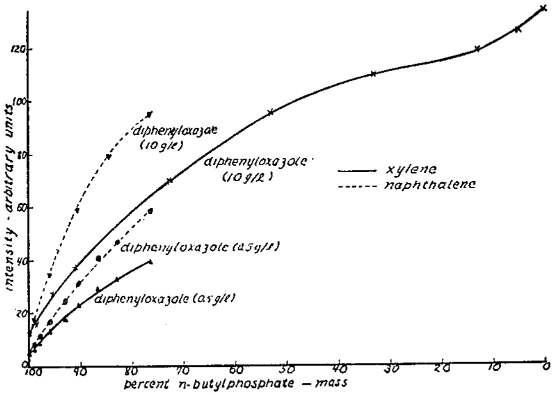

FIGURE 7 presents the gamma-ray-induced fluorescence of solutions in n-butylphosphate with two different concentrations of 2,5-diphenyloxazole as a function of additional xylene and naphthalene. It is seen that for both solute concentrations the naphthalene curve is above the xylene curve by a factor 1.5. This is interpreted as being due to a faster energy transfer from the n-butylphosphate to naphthalene than to xylene when equal masses of naphthalene and xylene are added, since there is no difference in energy transfer from naphthalene or xylene respectively to the solute as shown below. If the fluorescent intensities are compared when equal numbers of molecules are added to the original solvent (instead of equal masses), the difference is even more favorable for naphthalene. It is unfortunate that the naphthalene curve cannot be obtained for high concentrations; only about 23 percent of the solution can consist of naphthalene at room temperature.

If the fluorescence of 2,5-diphenyloxazole in pure naphthalene could be determined, the intensity would probably be the same and not higher than that in pure xylene. This conclusion can be deduced from the result that the addition of naphthalene to xylene does not noticeably alter the fluorescence although it is known that with sufficient naphthalene the energy is first transferred from xylene to naphthalene and then finally to the solute. If this conclusion is correct, the curves for xylene and naphthalene of FIGURE 1 would merge for 100 percent xylene and naphthalene.

Figure 8:
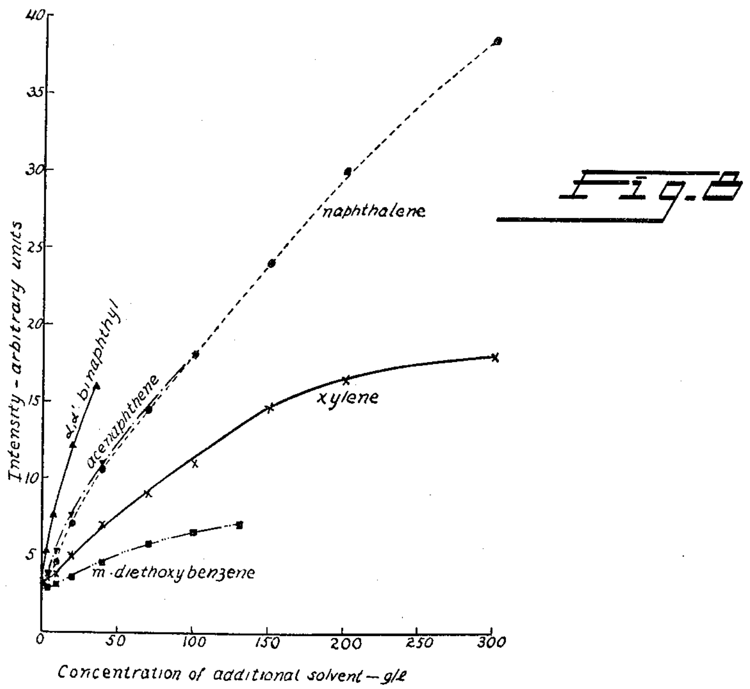

FIGURE 8 describes similar experiments, this time with a fixed concentration of 9,10-diphenylanthracene serving as the light emitting solute and various amounts of different additional "solvents." Again it can be seen that added naphthalene is more effective than xylene. Acenaphthene behaves very much the same as naphthalene; its own fluorescence is larger than that of naphthalene, but it is still small when compared to that produced by the 9,10-diphenylanthracene, 1,1'-binaphthyl gives a much larger fluorescence than naphthalene; in this case the energy is transferred to diphenylanthracene by absorption of radiation as well as by collision, and this makes the fluorescence curve higher. The effect of absorption is noticeable because of the small concentration of diphenylanthracene, which is only slightly soluble.

These measurements show that the energy transfer to naphthalene and to related compounds is very similar. The energy transfer to m-diethoxybenzene has also been measured in order to study the behavior of a substance which is a moderately effective solvent (as a pure solvent it is about half as effective as xylene). In n-butylphosphate it is again about half as good as xylene, indicating that the energy transfer from n-butylphosphate to this substance is of the same order as to xylene.

Comparison of these results with those obtained from the addition of naphthalene to a solution of p-terphenyl in xylene reveals that the lifetime of the excited solvent molecule is shorter in n-butylphopshate than it is in xylene; this is seen from the better energy transfer to naphthalene in solutions made with xylene than in those with n-butylphosphate. Thus when 10 g./l. of naphthalene are added to a terphenyl-xylene solution a decrease in fluorescence by a factor of more than three is found. In a solution of 2,5-diphenyloxazole in n-butylphosphate, however, the addition of 10 g./l. of naphthalene which reduced the n-butylphosphate concentration to 90% produces only a small increase as can be seen in FIGURE 7. In the terphenyl-xylene solutions most of the energy originally in the xylene proceeds to the naphthalene with only 10 g./l.; but it cannot then go to the terphenyl because of the close proximity of the energy levels of naphthalene and terphenyl; thus the observed large decrease in light output occurs. In n-butylphosphate, however, with the same amount of naphthalene only a small fluorescence change occurs because of the poorer transfer of energy to the naphthalene due to the shorter lifetime of the excited butylphosphate molecule. Only when larger amounts of naphthalene are present can this effect of shorter lifetime be overcome. It is interesting to note that the fluorescence of the highest available naphthalene concentration is only about 25 percent below the maximum fluorescence in solutions with pure xylene. This shows that the energy transfer process from n-butylphosphate to naphthalene does not involve much loss of energy, which is in agreement with the contention made earlier.

Figure 9:
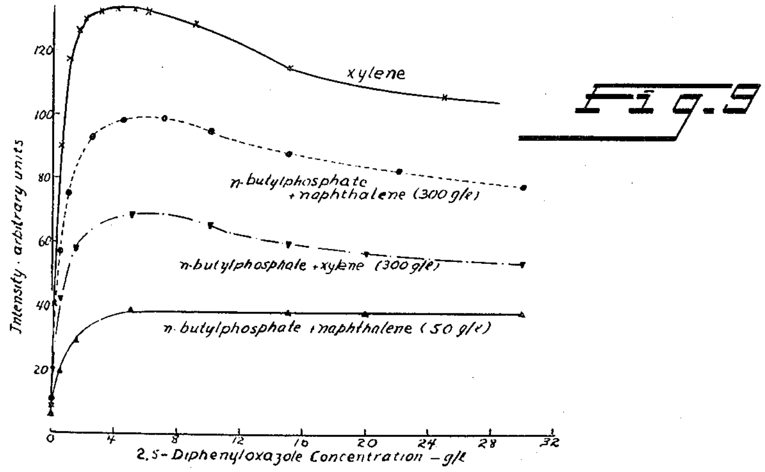

FIGURE 9 presents the fluorescence light output as a function of the 2,5-diphenyloxazole concentration for various amounts of xylene and naphthalene in n-butylphosphate. For the maximum naphthalene concentration (23 percent of solution by mass), the intensity is already 75 percent of that of a 100 percent xylene solution. Since 25 percent of the primary energy is directly absorbed in the naphthalene, it is calculated from the preceding result that about 70 percent of the energy directly absorbed in n-butylphosphate is transferred to the naphthalene at these concentrations whereas with xylene only about 50 percent is transferred. This conclusion is drawn since measurements with light-induced fluorescence have shown that the addition of naphthalene or xylene does not change the light output and thus the internal quenching of such a solute, and since the curves of fluorescence vs. concentration for naphthalene and xylene respectively in n-butylphosphate have the same forms. These curves display shifts of the optimum concentration toward higher concentrations when compared to the curve of 2,5-diphenyloxazole in xylene. This can be interpreted as stemming from a shorter lifetime (due to a stronger quenching) of the excited naphthalene or xylene molecules by surrounding n-butylphosphate molecules than without this substance being present. Such an increase of quenching reduces the true lifetimes of these excited molecules, thereby decreasing the energy transfer probability to the solute; the result of the shortening of lifetime is a shift in the maximum of the fluorescence vs. concentration curve. Such stronger quenching by the addition of n-butylphosphate to xylene can also be seen from the xylene curve of FIGURE 7. There the drop in fluorescence occurring when small amounts of n-butylphosphate are added to xylene is probably due to this quenching.

One must also consider that some energy transfer still takes place directly from n-butylphosphate to the solute; this increases with greater 2,5-diphenyloxazole concentration. Its contribution, however, is still too small in the case of 300 g./l. of naphthalene or xylene to account for the observed shift in the curve; with only 50 g./l. of naphthalene present this process does become important and partially accounts for the different shape of the corresponding curve. The forms of the 300 g./l. naphthalene curve and that of the respective xylene curve, however, are so similar to each other that no difference in lifetime between the excited xylene and excited naphthalene molecules (i.e., in energy transfer from these molecules to the solute) is indicated under these conditions where the n-butylphosphate quenching is relatively small.

Such a difference is, however, indicated in other cases in which strong quenching by the surrounding molecules occurs and becomes quite evident from the experiments described in connection with FIGURE 10. Here the quenching influence of chloroform on gamma-ray-induced fluorescence is studied in solutions of 2,5-diphenyloxazole in pure xylene and in xylene plus 300 g./l. naphthalene; in the latter case the energy transfer to the fluorescent solute takes place from the naphthalene molecules. The influence of chloroform on the diphenyloxazole molecule does not differ in the two solutions.

It is thus shown that the quenching in the xylene plus naphthalene solution is smaller than in the solution with xylene alone throughout the entire range of chloroform concentrations including small concentrations. Energy transfer from the "poor" solvent (chloroform), especially at low chloroform concentrations, produces little interference and therefore does not conceal the actual quenching process. The difference between the two "solvents" is due to the difference in quenching of the excited molecules of xylene and naphthalene respectively; the naphthalene molecule is therefore considered to be quenched less by chloroform than the xylene molecule in agreement with the previous results.

Results with naphthalene similar to those described above in n-butylphosphate are also obtained with other "poor" solvents and quenchers; some examples can be seen in FIGURE 11.

For many experiments, especially in the field of nuclear physics, it is desirable for specific elements (or more complicated substances) to be present in a scintillating material rather than outside of the scintilltaing material. Frequently, however, the substance by itself has only poor fluorescent properties under high-energy radiation, and when it is put into an efficient fluorescent solution a considerable decrease in light output results because of quenching. Such behavior is often found when materials contain elements of medium or heavy atomic weights. By applying the results obtained with added naphthalene or its compounds, solutions which exhibit considerable fluorescence have been made with such quenching molecules present.

A list of substances containing different elements is presented in FIGURE 11 with which at least moderate high-energy fluorescence efficiencies can be obtained in organic liquid solutions. (The common elements in organic substances such as hydrogen, carbon, nitrogen, and oxygen are not included.) In most cases, as can be seen from the table, the addition of large amounts of naphthalene produces sizeable enhancement of the light output although considerable amounts of the quenching material may be present in the solution. The various fluorescent solutes shown in the table give comparable results, and in many cases 1,1'-binaphthyl may also be used.

p-terphenyl cannot be utilized with naphthalene as the "intermediate solvent" because of the insufficient energy transfer found with naphthalene. p-Terphenyl can, however, be used with biphenyl as the "intermediate solvent."

The heaviest element that has been successfully used to the present has been bismuth. The list of FIGURE 11 is representative of the initial results of a search for successful substances.

Finding substances with desirable properties presents certain problems. One of the major difficulties is the lack of solubility in suitable organic solvents. Once a soluble material is found, it must generally be such that it does not quench the solution too strongly. The naphthalene or its compounds, as discussed above, acts as a "solvent" in which less quenching occurs and provides a medium to and from which more energy is transferred.

It has also been found that fluorescence enhancing of scientillation counters is possible in solutions containing considerable amounts of water. Water ordinarily produces a sizable quenching of fluorescence and moreover has only very poor capabilities of transferring energy to suitable solutes. Also, most of the fluorescent solutes that are appropriate for high-energy-induced fluorescence are at best only slightly soluble in water, and most solvents with good energy transfer properties are not miscible with water.

Because metallic salts, as well as many other materials are soluble in water, a scintillation solution which will provide satisfactory fluorescence output when water is added is highly desired.

Figure 12:
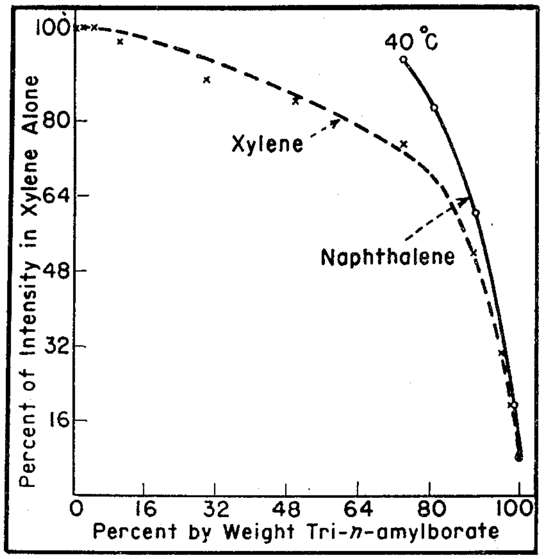
FIGURE 12 is a graph showing the relative fluorescence intensity of the scintillator solution in solvents of tri-n-amylborate plus naphthalene or plus xylene.

In boron-rich solutions alkyl borate esters have been found to have a greatly increased fluorescence upon adding considerable amounts of an "intermediate solvent" such as naphthalene. Thus as shown in FIGURE 12 a solution consisting of 26% naphthalene by mass and tri-n-amylborate as solvent and 2,5-diphenyloxazone as solute gives a fluorescence intensity 93% as great as the same amount of solute in pure xylene. Almost identical results were obtained with the higher alkyl esters tri-n-hexylborate and tri-n-octylborate.

Naphthalene also increases the high-energy-induced fluorescence of trimethylborate solutions with suitable solutes with considerably greater efficiencies than the same percentage of xylene. Thus, in a solution of 2,5-diphenyloxazole in 75% trimethylborate and 25% naphthalene, about 80% of the fluorescence of the same solute in 100% xylene is obtained; however, in a solution containing 2,5-diphenyloxazole with the same amount of xylene instead of naphthalene, only 53% fluorescence is obtained; 25% is nearly the maximum amount of naphthalene that is soluble in trimethyl-borate at room temperature. If greater fluorescence is desired, it is best to keep the naphthalene concentration as high as possible and add xylene or phenylcyclohexane while removing trimethylborate.

Figure 13:
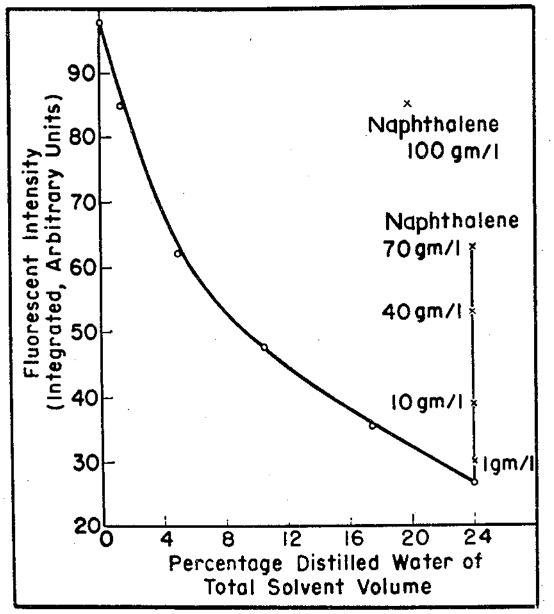
FIGURE 13 is a graph showing fluorescence of a water containing scintillating solution.
Figure 2:
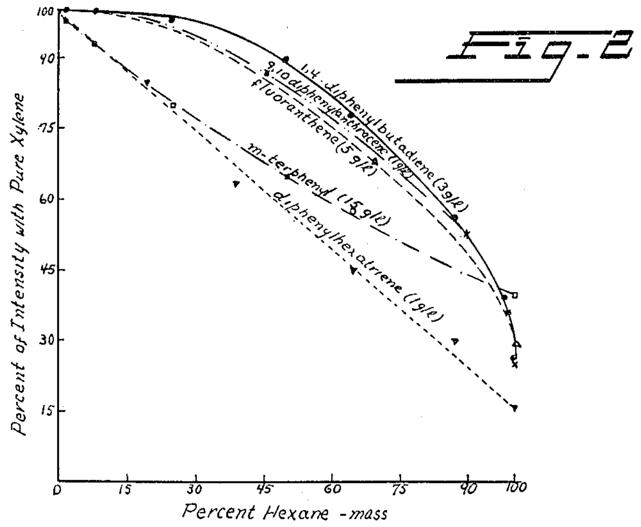
FIGURES 2 through 6 are graphs showing the results of the first series of tests.
Figure 3:
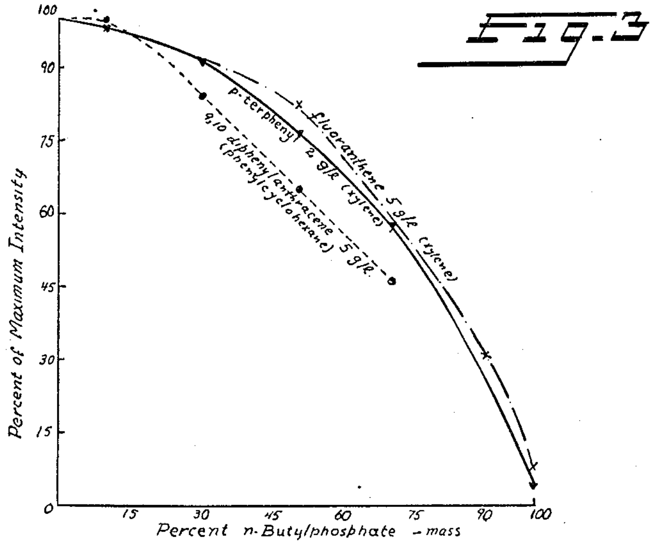

In special cases, the boron content may be of prime interest; trimethylborate is then superior to triamylborate because the boron content is twice as great. However, an advantage of tri-n-amylborate and the higher alkyl esters over those used previously in liquid-scintillation neutron-counter work is that the alkyl esters have less hydrolysis in air.

p-Dioxane is one solvent known to have excellent transfer properties that is completely miscible with water. FIGURE 13 shows the effect of the quenching caused by the addition of distilled water of the fluorescence of a 2,5-diaphenyloxazole solution in p-dioxane. With 25% water, a quenching of more than 70% of the original light intensity occurs in a solution of 2,5-diphenyloxazole in purified dioxane. We have found that addition of naphthalene to such a solution results in a large increase in fluorescence to about 65% of the original fluorescence in the pure p-dioxane; with 20% water, 100 g./l. of naphthalene gives 85% of the pure dioxane fluorescence. (The fluorescence in pure p-dioxane is about 55% of that of a solution of 5 gm./l. of p-terphenyl in xylene.)

Only slightly more naphthalene or water added to such a solution causes it to separate into two phases, which is undesirable for many applications. If more water is required, the amount of naphthalene must be decreased, resulting in a considerable decrease in fluorescence. Such solutions may still be acceptable for certain counting experiments.

Experiments with phenyl-biphenyloxadiazole, which is the most efficient solute known for liquid scintillators, did not produce substantially more fluorescence than 2,5-diphenyloxazole, partially because of its more limited solubility.

The mere addition of water in certain quantities will change the polarity of the solution sufficiently to permit materials to be dissolved which are not otherwise soluble in scintillating solutions.

An example of a typical water-containing scintillator solution of our improved efficiency due to the addition of a fluorescent enhancer such as naphthalene is:

| | |
|---|---|
| p-Dioxane (purified) --- | 80% (by volume). |
| Distilled water -------- | 20% (by volume). |
| Naphthalene ---------- | 100 grams per liters of solvent. |
| 2,5-diphenyloxazole ---- | 5 grams per liter of solvent. |

It is preferable for highest fluorescent output that the p-dioxane be purified for use in the scintillator liquid. A satisfactory method of p-dioxane purification is described in "Laboratory Experiments in Organic Chemistry" by L. Fieser.

In biological work it is common to work with solutions which contain alcohols, such for example as ethanol (95%) or methanol. The addition of alcohols to scintillating solutions causes a decrease in the fluorescence intensity in much the same manner as does water. When naphthalene is added to the solution, the fluorescence intensity increases but only a relatively small amount and the maximum efficiency obtainable is still less than 15% as efficient as p-terphenyl (5 gm./l.) in xylene. This is in comparison to the approximately 50% efficiency when naphthalene is added to a solvent formed of p-dioxane and water.

We have found the fluorescence intensity of solutions containing alcohol can be greatly increased if the alcohols are first mixed with considerable amounts of xylene as the primary solvent, then larger amounts of naphthalene as an "intermediate solvent" can be dissolved and the resulting solution exhibits a much higher fluorescence output. The final solvent then comprises the alcohol containing substance, a substantial quantity of "effective" solvent such as xylene which is preferably in excess of 50% (by volume) of the total solvent and as much "intermediate solvent," such as naphthalene as can be dissolved.

It is thus apparent that the use of an "intermediate solvent" in addition to the "primary" solvent has broad application in a large number of types of scintillating solutions. Based on the above experiments, the "intermediate solvent" may be characterized in that its lowest energy level of excitation must be smaller than the lowest energy level of excitation of the major or primary solvent and greater than the lowest energy level of excitation of the fluorescent solute. "Intermediate solvent" is a substance (it may be solid at room temperature) which when present in moderate amounts (greater than 20 g./l.) has the property of taking over much or most of the energy originally in the bulk material (major solvent) and transferring it more efficiently to the emitting solute (fluorescing material) than does the bulk material. The lowest excited electronic state of the "intermediate solvent" lies between that of the bulk material and that of the emitter. (The lowest state has an energy greater than 3.4 e.v.) The transfer to and from the "intermediate solvent" does not take place primarily via radiation. The time constant of the "intermediate solvent" is longer than that of the bulk material.

The "intermediate solvent" may also be characterized by the property that certain materials have less quenching effect on its molecules than on the molecules of the primary solvent; or stated in other words, the lifetime of excitation of the "intermediate solvent" molecule is not reduced as much as the time of excitation of the primary solvent molecule by the quenching action of said materials. Another property of an "intermediate solvent" is that it enhances the fluorescence of solutions made in "poor" solvents. While naphthalene has been found to be one of the best enhancing materials, naphthalene derivatives including ethoxynaphthalenes, methylnaphthalenes, methoxynaphthalenes, benzylnaphthalenes and naphthylamines have been found to have valuable enhancing properties. Other "intermediate solvents" include acenaphthene and derivatives, binaphthyl and derivatives, biphenyl and derivatives, fluorene and derivatives, anisole, durene, dimethoxystilbene, cyclohexylbenzenes and bicyclohexyl. The phrase "intermediate solvent" as used in the claims means the foregoing materials or equivalent materials having the foregoing properties.

This invention is also very useful with rigid scintillator solutions such as polystyrene, polyvinyl toluene and Lucite (polymethylmethacrylate). In such solutions, the rigid polymerized material serves as the bulk solvent in which a compound of a heavy metal and a light emitting solute such as 2,5-diphenyloxazole may be incorporated. As pointed out above, the heavy metal compounds quench the fluorescence of the scintillator solution to such an extent that it is no longer useful. Addition of an "intermediate solvent" such as naphthalene overcomes this quenching to a large extent. For example, if the fluorescence efficiency of a scintillator comprising polystyrene as major solvent and 0.045 M 2,5-diphenyloxazole as fluorescing solute is called 100, the incorporation of 0.14 M diphenylmercury reduces it to 24. If 0.2 M naphthalene is incorporated as well, the efficiency rises to 50.

The foregoing example illustrates a system wherein the scintillator solution becomes a weakly emitting body because of the quenching effect of the added heavy metal compounds and wherein the emitting properties are improved by simply adding an amount of "intermediate solvent" not greater than that which prevents polymerization or solidification of the rigid plastic material. The "intermediate solvent" in this instance serves to reduce the effect of the quench caused by the compounds of the heavy metal elements.

With the same rigid plastic material (polystyrene) and light emitting solute (2,5-diphenyloxazole, 0.023 M) but without the heavy metal compound, use of "intermediate solvent" (naphthalene) is desirable because it decreases the reabsorption of its own fluorescence by the solute molecules. It is thus advantageous to use as low a concentration of the fluorescing solute as possible in long rods to thereby make it possible to transmit the fluorescing light through the rigid scintillator rods to be detectable at the end of the rod. This is possible because the "intermediate solvent" does not have the property of absorbing the fluorescing light of the solute and the presence of the "intermediate solvent" makes practical the use of as little as from 50 down to 20% of the light emitting solute with no decrease in intensity of light output.

| Example: | Intensity, arbitrary units |
|---|---|
| [Polystyrene]+2,5-diphenyloxazole (0.023 M) | 1 |
| [Polystyrene+naphthalene, 0.2 M]+2,5-diphenyloxazole (0.0045 M) | 1 |

Polymethylmethacrylate (Lucite) has mechanical and optical advantages over the plastics commonly used as the major solvent in plastic scintillators. However, it is poor for energy transfer and has therefore not found practical use. The incorporation of an "intermediate solvent" such as naphthalene improves the fluorescence efficiency so that Lucite scintillators become useful. For example: if a scintillator comprising Lucite as major solvent and 0.2 M 2,5-diphenyloxazole as fluorescing solute has a fluorescence efficiency of 100, the additional incorporation of 0.8 M naphthalene raises it to approximately 250.

In summary, the present invention has a number of important practical applications. First, it permits the enhancement of scintillation solutions containing water (5% or more). Water has been found to reduce the fluorescence efficiency to such a degree that the conventional prior scintillation solution is essentially useless for detection and/or measurement. The greater the water content the less the light output. However, for a large number of biological, medical and physical applications, large amounts of water are essential for solubility of the material being tested. By the use of the "intermediate solvent" in accordance with the present invention, these solutions can be made efficient scintillators.

Second, this invention provides enhancement of scintillation solutions containing compounds of elements of atomic number greater than 10. These compounds in most cases quench the fluorescence of a scintillator and themselves make poor light emitting materials. Research experimentation and practical applications especially in nuclear physics, often use materials containing elements of large atomic numbers. The use of the "intermediate solvent" makes detection and measurement feasible under the adverse conditions which prevail when high atomic number materials are in the scintillator. In addition to the examples given above, the following specific examples are given:

| | Intensity, arbitrary units |
|---|---|
| (*a*) [Tetraethyl lead 10%+xylene 90%]+9,10-diphenylanthracene (10 g./l.) | 1.0 |
| [Tetraethyl lead 9%+xylene 81%+naphthalene 10%]+9,10-diphenylanthracene (10 g./l.) | 1.7 |
| (*b*) [p-dioxane+water 20%]+cupric nitrate (15 g./l.)+2,5-diphenyloxazole (5 g./l.) | 1.0 |
| [p-dioxane+water 20%+naphthalene 60 g./l]+cupric nitrate (15 g./l.)+2,5-diphenyloxazole (5 g./l.) | 2.8 |
| (*c*) [Polystyrene]+diphenylmercury (0.14 M)+2,5-diphenyloxazole (0.045 M) | 1.0 |
| [Polystyrene+naphthalene 0.8 M]+diphenylmercury (0.14 M)+2,5-diphenyloxazole (0.045 M) | 2.0 |

Third, the present invention is useful for the enhancement of scintillators of high viscosity, an important subclass being the rigid plastic scintillator. Plastic scintillators are essentially of two types in relation to the invention. One type, such as scintillators made with polystyrene or polyvinyl toluene, is made by the "intermediate solvent" of the present invention to fluoresce efficiently at much lower concentration of the emitting materials than without the invention. This is of great significance when emission through long lengths of scintillators are required as in use with a grid of rods. Reabsorption due to the large concentration of the light emitting solute is greatly reduced. This application is important in present day nuclear work.

| Example: | Intensity, arbitrary units |
|---|---|
| [Polystyrene+2,5-diphenyloxazole (0.023 M) | 1.0 |
| [Polystyrene+naphthalene, 0.2 M]+2,5-diphenyloxazole (0.0045 M) | 1.0 |

The other type, such as scintillators made with polymethacrylate (PMMA), is made by the invention to fluoresce much more efficiently at all practical concentrations.

| Example: | |
|---|---|
| [PMMA]+2,5-diphenyloxazole (0.045 M) | 0.1 |
| ([PMMA+naphthalene, 0.8 M]+2,5-diphenyloxazole (0.045 M) | 2.4 |

Fourth, scintillator solutions made with solvents having poor ability to transfer energy to the solute can be made to yield markedly improved results by the addition of an "intermediate solvent" in accordance with the present invention.

| Example: | |
|---|---|
| [n-Butylphosphate]+2,5-diphenyloxazole (10 g./l.) | 1.0 |
| [n-Butylphosphate 70%+naphthalene 30%]+2,5-diphenyloxazole (10 g./l.) | 8.0 |

Other examples of solvents having poor energy transfer properties with which the invention is capable of enhancing include:

| | |
|---|---|
| Dimethylformamide | Cyclohexane |
| Tricersylphosphate | Butyl borate |
| Paraffin oil | Amyl borate |
| Hexane | Tetraethylorthosilicate |

From the foregoing, it is apparent that the use of the "intermediate solvent" of the present invention is for the purpose of increasing fluorescence of the solution where the fluorescence is relatively low due to either the use of a "poor" solvent or due to the presence of quenching materials in the solution. Our invention cannot be used to increase the fluorescence where the low fluorescence is due to use of a poor or weak light emitting solutes. By efficient light emitting solutes, we mean a solute which when dissolved in an "efficient" solvent such as those enumerated in Table 1 above, in an optimum concentration has a scintillating efficiency which is at least 15% of that of a solution of p-terphenyl (5 grams per liter) in xylene.

It will be understood that each component of our improved solutions may consist of more than one compound, depending upon the intended use, and that the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An improved scintillator solution comprising a weakly fluorescing scintillating solution containing a bulk solvent and an efficient light emitting solute, the energy transfer from said solvent to said solute being less than that which is theoretically possible, and an "intermediate solvent" having a lowest energy level of excitation less than the lowest energy level of excitation of said bulk solvent and greater than the lowest energy level of excitation of said solute, the "intermediate solvent" being present in a quantity in excess of 10 grams per liter of the bulk solvent, but less than that quantity which changes the physical or chemical state of the solution, to substantially increase the fluorescence output of the improved solution over that of the weakly fluorescing solution.

2. The improved scintillator solution as defined in claim 1 where in the light emitting solute is present in a quantity greater than one-half gram per liter and less than 20 grams per liter and said "intermediate solvent" is present in a quantity greater than 20 grams per liter.

3. An improved scintillator solution comprising a weakly fluorescing scintillating solution composed of a bulk solvent; an efficient light emitting solute; and a further substance in said solution for aiding in the detection of radiation, which causes quenching of an excited solvent molecule; and an enhancing element other than said further substance having a lowest energy level of excitation less than the lowest energy level of excitation of said bulk solvent and greater than the lowest energy level of excitation of said solute, said enhancing element being present in a quantity in excess of 10 grams per liter of the bulk solvent, but less than that quantity which changes the physical or chemical state of the solution, to substantially increase the fluorescene output of the improved solution over that of the weakly fluorescing solution.

4. The improved scintillator solution as defined in claim 3 wherein said further substance comprises a compound containing an element having an atomic number greater than 10.

5. The improved scintillator solution as defined in claim 4 wherein the bulk solvent is polystyrene, the solute is 2,5-diphenyloxazole and said enhancing element is naphthalene.

6. An improved scintillator solution comprising a weakly fluorescing scintillator solution composed of a bulk solvent having a poor ability to transfer energy selected from the group consisting of polymethylmethacrylate, n-butylphosphate, dimethylformamide, tricresylphosphate, paraffin oil, hexane, cyclohexane, butyl borate, amyl borate and tetraethylorthosilicate to an efficient light emitting solute; and an enhancing element other than said solvent or light emitting solute having a lowest energy level of excitation less than the lowest energy level of excitation of said bulk solvent and greater than the lowest energy level of excitation of said solute, said enhancing element being present in a quantity in excess of 10 grams per liter of said solvent but less than that quantity which changes the physical or chemical state of the solution, to substantially increase the fluorescence output of the improved solution over that of the weakly fluorescing solution.

7. An improved scintillator solution comprising: a weakly fluorescing scintillator solution composed of an efficient light emitting solute and a bulk solvent; and an enhancing element other than said fluorescent solute and said solvent selected from at least one of the group consisting of naphthalene, acenaphthene, binaphthyl, biphenyl, fluorene, anisole, durene, dimethoxystilbene, cyclohexylbenzenes, and bicyclohexyl; the enhancing element having a lowest energy level of excitation less than the lowest energy level of excitation of said bulk solvent and greater than the lowest energy level of excitation of said solute and being present in excess of 10 grams per liter of said solvent, but less than that quantity which changes the physical or chemical state of the solution, to substantially increase the fluorescence output of the improved solution over that of the weakly fluorescing solution.

8. In a rigid plastic scintillator solution comprising a rigid body of material selected from the class consisting of polystyrene, polyvinyl toluene and polymethylmethacrylate having mixed therewith as a solution an efficient light emitting solute, the improvement comprising an enhancing element other than said body of material and solute, said enhancing element being an "intermediate solvent" having a lowest energy level of excitation less than the lowest energy level of excitation of said rigid body material and greater than the lowest energy level of excitation of said solute, and being present in an amount to substantially increase the fluorescent output from said improved scintillator over that of the scintillator solution without said "intermediate solvent."

9. The scintillator solution as defined in claim 8 wherein said "intermediate solvent" is naphthalene and said light emitting solute is 2,5-diphenyloxazole.

10. The scintillator solution as defined in claim 9 wherein the amount of 2,5-diphenyloxazole is less than 0.01 M, said solution is in the form of a rod and said solvent is polystyrene.

11. A scintillator solution composed of a light emitting solute and a solvent, a radiating substance soluble in water mixed in said solution which reduces the fluorescing and light emitting efficiency of said solution, and means for increasing said efficiency comprising an "intermediate solvent" having the property of taking over a substantial portion of the energy from said bulk solvent resulting from absorption of radiation emanating from said radiating substance and transferring said energy to the light emitting solute, said "intermediate solvent" being present in excess of 10 grams per liter of the solvent but less than that quantity which changes the physical or chemical state of the solution to substantially increase the fluorescence efficiency of said solution.

12. The scintillator solution as defined in claim 11 wherein the light emittng solute is 2,5-diphenyloxazole, the solvent is p-dioxane and the "intermediate solvent" is naphthalene.

13. An improved scintillator solution comprising: an efficient light emitting solute in p-dioxane to provide a conventional scintillating solution, an improvement to said conventional solution comprising water present in an amount of at least 5% by volume of the p-dioxane, and naphthalene in excess of 10 grams per liter of the bulk solvent but less than that quantity which changes the physical or chemical state of the solution to substantially increase the fluorescence output of the improved solution over that of the solution without naphthalene.

14. An improved scintillator solution comprising: an efficient light emitting solute in p-dioxane to provide a conventional scintillating solution, an improvement to said conventional solution comprising water present in an amount sufficient to change the polarity of the solution sufficiently to permit materials to be dissolved in the scintillating solution which are not otherwise soluble in p-dioxane, and naphthalene in excess of 10 grams per liter of the bulk solvent but less than that quantity which changes the physical or chemical state of the solution to substantially increase the fluorescence output of the improved solution over that of the solution without naphthalene.

15. The improved scintillating solution as defined in claim 1 wherein the "intermediate solvent" is naphthalene.

References Cited in the file of this patent

UNITED STATES PATENTS 2,755,253 Muehlhause et al. ........ July 17, 1956
2,824,841 Buck et al. .............. Feb. 25, 1958

UNITED STATES PATENT OFFICE

CERTIFICATE OF CORRECTION

Patent No. 3,068,178 December 11, 1962

Hartmut P. Kallmann et al.

It is hereby certified that error appears in the above numbered patent requiring correction and that the said Letters Patent should read as corrected below.

Column 7, line 63, for "frm" read -- from --; column 8, line 28, for "the", first occurrence, read -- that --; column 10, line 75, for "tion this reduction in fluorescence is less in spite of the" read -- tion is due to the reduction in the lifetime (quenching) --; column 19, line 15, for "0.1" read -- 1.0 --.

Signed and sealed this 25th day of June 1963.

(SEAL)
Attest:

ERNEST W. SWIDER
Attesting Officer

DAVID L. LADD
Commissioner of Patents

Disclaimer 3,068,178.—*Hartmut P. Kallmann* and *Milton Furst*, Bronx, and *Felix H. Brown*, Kew Garden Hills, N.Y. SCINTILLATOR SOLUTION ENHANCERS. Patent dated Dec. 11, 1962. Disclaimer filed May 1, 1969, by the assignee, *Rahn Corporation.*

Hereby enters this disclaimer to claims 1, 2, 6 and 7 of said patent.

[*Official Gazette October 14, 1969.*]